W. F. SNEED.
VAPOR ELECTRIC APPARATUS.
APPLICATION FILED SEPT. 11, 1908.
996,371.
Patented June 27, 1911.
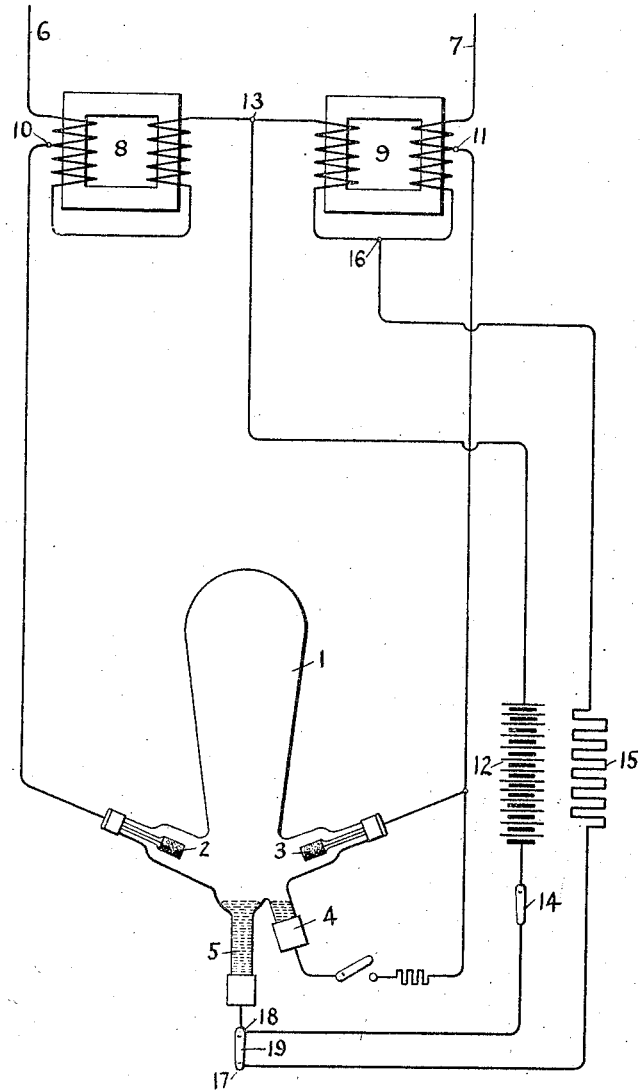
Witnesses:
Inventor:
William F. Sneed,
by _____ Att'y.

UNITED STATES PATENT OFFICE.

WILLIAM F. SNEED, OF SCHENECTADY, NEW YORK, ASSIGNOR TO GENERAL ELECTRIC COMPANY, A CORPORATION OF NEW YORK.

VAPOR ELECTRIC APPARATUS.

996,371.

Specification of Letters Patent. Patented June 27, 1911.

Application filed September 11, 1908. Serial No. 452,631.

*To all whom it may concern:*

Be it known that I, WILLIAM F. SNEED, a citizen of the United States, residing at Schenectady, county of Schenectady, State of New York, have invented certain new and useful Improvements in Vapor Electric Apparatus, of which the following is a specification.

My present invention relates to vapor electric devices, such as mercury arc rectifiers, lamps, or the like, and comprises certain means whereby such devices may be rendered stable in operation when carrying relatively small currents and whereby the devices may be readily and conveniently started into operation.

Vapor electric devices, such for example as mercury arc rectifiers, are not, as ordinarily designed, adapted to be operated with stability at low current values. In many cases it is desirable that a rectifier should be capable of such operation, as for example when it is desired to charge ignition batteries or for other purposes where relatively small currents are desired. Rectifiers of the character mentioned are ordinarily provided with a reactance or reactances for causing current waves of opposite polarity to overlap and thereby maintain the rectifiers in continuous operation. By increasing the amount of such reactance the rectifier becomes capable of operation at lower current values. However, such an increase in the reactance has the effect of rendering the apparatus relatively difficult to start.

In the starting of vapor electric apparatus it is necessary that a somewhat higher voltage or difference of potential be applied to the terminals of the arc than is necessary after the arc has started. In other words the shape of the volt ampere curve is such that at values of current lower than the normal current, it shows a higher voltage than at normal current. Hence where an abnormal amount of reactance is used for securing stability of operation of a rectifier at low currents, the starting of the rectifier is difficult, probably due to the absorption of voltage by the reactance which has the effect of decreasing the applied voltage at the terminals of the arc. I have overcome this difficulty by so arranging the apparatus that the reactance is in considerable measure cut out during the operation of starting and thereafter inserted when the apparatus is in operation.

The features of novelty which characterize my invention I have pointed out with particularity in the appended claims.

The invention itself will be better understood by reference to the following description taken in connection with the accompanying drawings which represent one embodiment of my invention.

In the drawings, a rectifier tube of usual form is indicated at 1 and is provided with main anodes 2 and 3, a starting anode 4 and the negative electrode or cathode 5. The rectifier tube being of usual construction requires no further description. It is connected in circuit as follows: The source of current supply is indicated by the alternating current mains 6 and 7. Across these mains, in series, are connected two inductance coils 8 and 9. The anodes 2 and 3 of the rectifier may be connected so as to receive any desired portion of the voltage impressed on the windings of the inductance coils. As here indicated, the connections are made to points 10 and 11, such that the coils serve in a measure as compensators and impress on the rectifier tube a voltage somewhat less than that of the mains 6 and 7. The use of the inductance coils in this instance to step down the voltage is shown merely by way of illustration, and it will be evident that any other suitable connections such as to give lower or higher voltage may be made as desired. The load which the rectifier is intended to supply is represented in the drawing as consisting, in this instance, of a storage battery 12. This battery is arranged so that one terminal is connected to the junction 13 between the coils 8 and 9, while the other terminal may be connected through a switch 14 to the negative electrode of the rectifier. This is the usual connection.

For the purpose of starting the rectifier it has been common to employ a resistance which is substituted for the battery at starting and, as soon as the rectifier is in operation and the battery put in circuit, is then disconnected. The use of the resistance affords a path free from counter electromotive force and permits ready starting of the rectifier.

According to my present invention, I so arrange this resistance that it furnishes a path for battery current through a certain portion of one of the reactance coils during the operation of starting. This action materially decreases the impedance of the coil to the starting current and enables the operator to put the rectifier in normal operative condition before shifting over to normal load and normal reactance. This auxiliary or starting resistance is indicated at 15, and is connected to the middle point 16 of the coil 9. The other terminal of the resistance and also the positive terminal of the battery 12 are connected respectively to contacts 17 and 18 coöperating with the switch arm 19. During the operation of starting, the resistance 15 furnishes a path for battery current by way of switches 14 and 19, resistance 15, and back through one coil of reactance 9. So far as current from the rectifier is concerned, the resistance 15 may be regarded as in shunt to the path made up by battery 12 and one half of reactance coil 9, thereby furnishing a short path for the rectified current returning to the alternating current main 7. The impedance offered to this rectified current by the right hand coil of reactance 9 is sufficiently small to render the starting of the rectifier easy, and as soon as the rectifier is started, the switch 19 can be opened from the contact 17, thereby cutting out the starting resistance and forcing all the rectified current to take the path through the battery load 12.

While I have illustrated in the drawing one modification suitable for carrying out my invention, it is evident that various modifications thereof may be made, for which reason I do not wish to limit myself to the exact details therein shown.

What I claim as new and desire to secure by Letters Patent of the United States, is:

1. The combination with an alternating current vapor electric device, of a reactance for operation therewith, a load circuit containing a translating device, a starting circuit, means for temporarily connecting said circuit to said reactance whereby the reactance for the load current is reduced during starting.

2. The combination of a vapor electric rectifier, an inductance coil in circuit therewith, a load circuit, a starting circuit, and a temporary connection between the starting circuit and an intermediate point on the inductance coil.

3. The combination of a vapor electric apparatus, an inductance coil in circuit therewith, a load circuit traversed by current in said inductance coil, and a starting circuit connected so that its current traverses a part only of the winding of the inductance coil.

4. The combination of a vapor electric rectifier, alternating current mains, inductance coils connected across said mains, a load circuit having one terminal connected to the junction between said inductance coils, and a starting circuit having one terminal connected at an intermediate point of the winding of one of said inductance coils.

5. The combination of a vapor electric device, a load circuit, an inductance coil for keeping the device alive while running, the reactance of said coil being so great as to interfere with the starting of said device, and means for decreasing the amount of inductance during starting while maintaining the impressed voltage unchanged.

6. The combination of a vapor electric device, alternating current mains, a direct current load circuit, a reactance connected to said mains and in circuit with said load circuit, and means for decreasing the reactance while starting said vapor device without decreasing the alternating current potential impressed thereupon.

In witness whereof, I have hereunto set my hand this 9th day of September, 1908.

WILLIAM F. SNEED.

Witnesses:
BENJAMIN B. HULL,
MARGARET E. WOOLLEY.